UNITED STATES PATENT OFFICE.

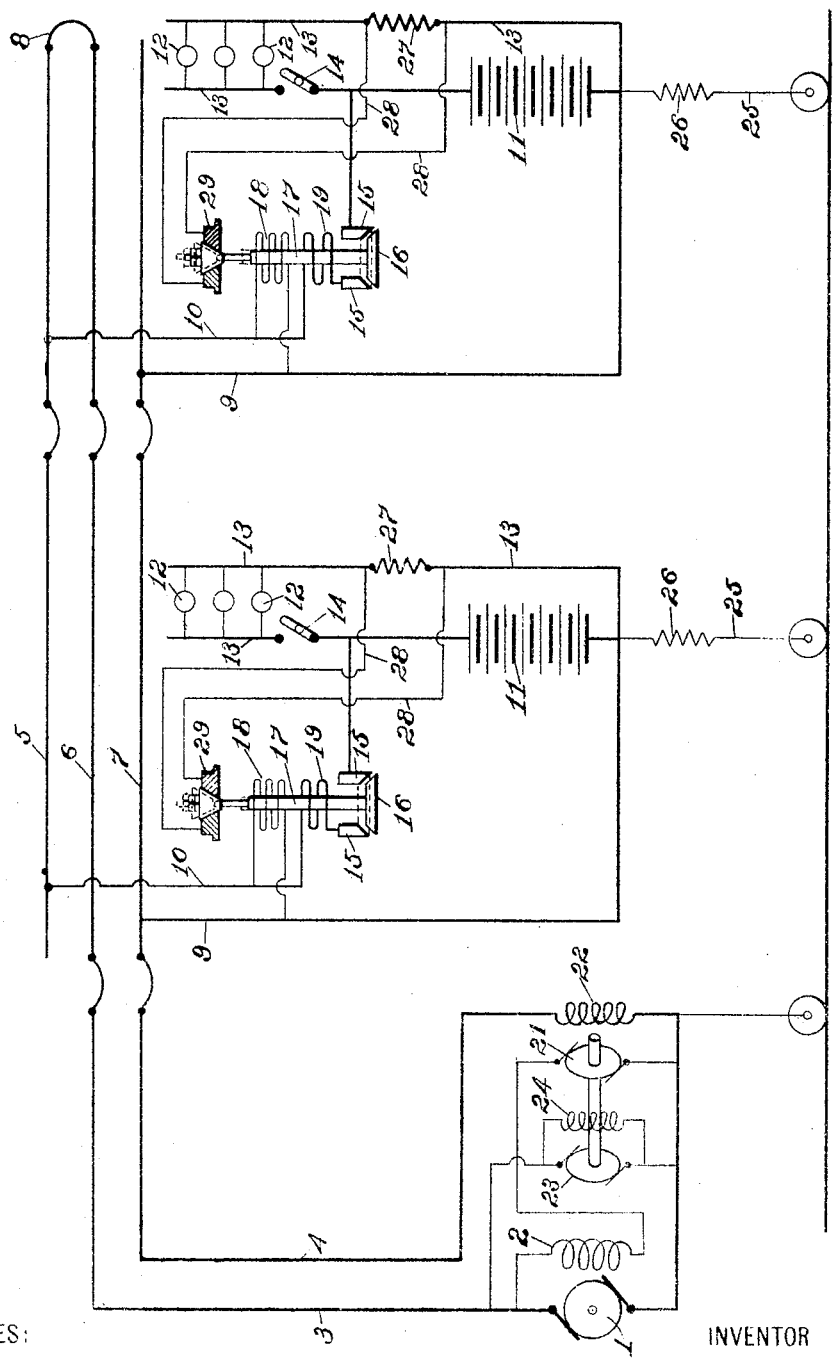

WILLIAM L. BLISS, OF BROOKLYN, NEW YORK, ASSIGNOR TO BLISS ELECTRIC CAR LIGHTING COMPANY, OF MILWAUKEE, WISCONSIN, A CORPORATION OF WISCONSIN.

LIGHTING SYSTEM.

No. 799,522.    Specification of Letters Patent.    Patented Sept. 12, 1905.

Application filed June 15, 1904. Serial No. 212,593.

*To all whom it may concern:*

Be it known that I, WILLIAM L. BLISS, a citizen of the United States, residing at Brooklyn, in the county of Kings and State of New York, have invented new and useful Improvements in Lighting Systems, of which the following is a full, clear, concise, and exact description, reference being had to the accompanying drawing, forming a part of this specification.

The present invention relates to improvements in systems of electrical distribution. Although it is particularly adapted for lighting cars or trains, it may be applied to other purposes.

The particular form of lighting system to which the present invention especially relates is adapted to be employed for lighting a train of cars. It is provided with a single generator which furnishes the current for lighting the entire system. It is also provided with storage batteries and translating devices arranged in circuit with said generator, a storage battery and translating devices being carried upon each car or unit of the train. The generator is driven by an axle or other means, and it is regulated to confine the output thereof within safe limits, notwithstanding the wide variations in speed to which it is subjected.

Whenever cars are added to the train, the current delivered by the generator must increase, and whenever cars are taken therefrom it must decrease. If the means which regulate the generator be subjected to variations in current under such circumstances, then the regulation of the generator will be altered, thereby preventing said generator from making the output thereof commensurate with the demands for current.

The object of the present invention is to provide means which will prevent the means which regulate the generator from altering the regulation of the generator when variations in the output of the generator result from changes in the number of cars or units in the train.

Various modifications of the present invention have been set forth and claimed in other applications. The application which was filed June 16, 1904, sets forth a system wherein means are provided for preventing the regulation of the generator from being altered upon variations in the output of the generator resulting from changes in the number of translating devices in operation upon any car, as well as when variations in the output of the generator result from changes in the number of cars or units in the train.

An embodiment of the present invention is illustrated in the accompanying drawing, which shall be hereinafter described. It will be understood, of course, that the invention may assume other forms and that the system illustrated in the drawing has been selected merely for the purpose of indicating certain features of the invention.

In the preferred form of the present invention a dynamo-electric machine is employed to introduce a counter electromotive force into the field-circuit of the generator, and thus regulate the generator; but it will be understood that any other form of regulator may be employed.

Upon a unit of the train—as, for instance, the tender of the locomotive—is mounted a generator having an armature 1 and a field 2, said armature being geared to an axle or connected to any other suitable source of power. The brushes of the armature have connected thereto a supply-circuit provided with mains 3 and 4. Throughout the train extends a train-line having conductors 5, 6, and 7, the conductors 6 and 7 being connected to the mains 3 and 4 at the forward end of the train and the conductor 6 being connected to the conductor 5 by a jumper 8 at the rear end of the train. Each car in the train has located thereon a local circuit having mains 9 and 10 connected to the conductors 7 and 5, respectively, of the train-line, and to this local circuit are connected a storage battery 11 and translating devices 12—such as lamps, fan-motors, and other appliances—said translating devices preferably being connected in the translating branch 13 13 of the local circuit. The circuit of the translating devices may be controlled by a switch 14. The voltage impressed upon each local circuit will be the same, as the current must be transmitted the same distance through the train-line in reaching each local circuit. It will be understood that the local circuit upon each car may be arranged in various ways and that, so far as the generic features of the present invention are concerned, any circuit wherein the storage battery and translating devices may be arranged will be an equivalent thereof.

The local circuit upon each car is preferably controlled by an automatic switch having stationary contacts 15 15 and a movable contact 16, carried by a plunger 17 and adapted to engage said stationary contacts. The plunger 17 may be actuated to operate the switch by a solenoid 18, of fine wire, connected in a shunt-circuit extending across the local circuit, and a solenoid 19, of coarse wire, connected in the local circuit in series with the switch-contacts. When the generator develops a voltage, for instance, equal to that of the battery, the switch will be operated by the shunt-solenoid 18 to close the local circuit. So long as the voltage developed by the generator remains as great as that of the battery the automatic switch will remain closed and the series solenoid will assist the shunt-solenoid in keeping the movable contact firmly in engagement with the stationary contacts; but when the generator voltage falls below the battery voltage the switch will open, as then the series solenoid will oppose the action of the shunt-solenoid, due to the reversal of the polarity of the series solenoid by current from the battery flowing backward through the local circuit.

Upon the unit of the train carrying the generator is carried a dynamo-electric machine or counter-electromotive-force device having an armature 21 and a field or controlling magnet 22, said field or controlling magnet being connected in series in the supply-circuit and the armature 21 being connected in the field-circuit of the generator to introduce a counter electromotive force therein to oppose the current tending to flow through the field 2. A motor having an armature 23 and a field 24 and connected across the supply-circuit may be provided to start the counter-electromotive-force device when the generator commences to operate.

When the generator is operative, the dynamo-electric machine or counter-electromotive-force device will be in operation and introduce a counter electromotive force into the field-circuit of the generator to oppose the current which tends to flow through the generator-field, due to the generator voltage, the field thereof being excited by current flowing through the supply-circuit. If the electromotive force developed by the generator increases, the current traversing the field or controlling magnet of the counter-electromotive-force device will increase. The counter electromotive force introduced into the field-circuit of the generator will then be increased, and consequently the strength of the field of the generator will be reduced. If the electromotive force developed by the generator decreases, the current traversing the field or controlling magnet of the counter-electromotive-force device will decrease. The counter electromotive force introduced into the field-circuit of the generator will then be decreased, and consequently the strength of the field of the generator will be increased. The strength of the field of the generator thus being varied inversely as the electromotive force developed by the generator tends to vary, the output of the generator will be confined within prearranged limits, notwithstanding the excessive variations in speed to which the generator is subjected.

Between the local circuit upon each car and the supply-circuit extends a shunt-circuit 25, which passes around the field or controlling magnet 22, said shunt-circuit preferably being provided with a resistance 26. The conducting-frames of the units of the train and the track preferably constitute parts of the shunt-circuits; but it is obvious that said shunt-circuits may be formed by any suitable conductors. These shunt-circuits divert current from the field or controlling magnet 22 and are arranged in parallel with each other. Inasmuch as a shunt-circuit is provided for each car in the train, the portion of the output of the generator diverted from the field or controlling magnet 22 will be dependent upon the number of cars in the train. Therefore when a variation in the output of the generator results from changing the number of cars or units in the train the portion of the output of the generator diverted by the shunt-circuits will be varied to such an extent that the current traversing the field or controlling magnet 22 will remain substantially the same as before. Accordingly the regulation of the generator will remain unchanged. The generator may therefore vary the output thereof whenever the number of cars in the train is changed, and thus maintain an output which is commensurate with the demands for current.

It may be assumed when two cars are in the train, as indicated in the drawing, that the generator delivers a current of one hundred amperes, a current of fifty amperes being consumed in each car. Now then if a car be added to the train the output of the generator would increase to one hundred and fifty amperes, and if a car be removed from the train the output of the generator would decrease to fifty amperes. As the number of shunt-circuits extending around the controlling-magnet 22 will be changed when the number of cars in the train is changed, the current diverted from the controlling-magnet will be varied in accordance with these variations in the current, and hence the regulations of the generator will remain unchanged. It is therefore possible to change the number of cars in the train in any way and still have the generator deliver a current which is suitable for operating all of the lamps and charging all of the storage batteries upon the train. The current which the generator delivers to the storage batteries will vary in almost exact proportion to the variations in the increase in the electromotive force of the generator above the normal electromotive force of the batteries. In consequence when a variation occurs in the speed of the generator the resulting variation in the electromotive force impressed upon the batteries will cause considerable variation in the output of the generator, and as the current flowing through the controlling-magnet will then vary the field strength of the generator will be varied approximately inversely as the speed thereof varies. The generator will therefore be regulated as the speed thereof varies to confine the variations in the generator output within prearranged limits. While the generator is inoperative the translating devices 12 may be operated by the storage batteries. When the generator becomes operative, it will deliver current to the supply-circuit. While the voltage of the generator remains substantially equal to that of the batteries the generator and the batteries will together furnish the current for operating the translating devices; but when the generator voltage exceeds that of the batteries the batteries will cease to discharge current and the generator will furnish all the current for operating the translating devices and also current for charging the batteries, the current flowing from the positive terminal of the generator through supply-main 3, conductor 6, jumper 8, conductor 5, main 10, series solenoid 19, switch-contacts 15 16 15, thence dividingly through the translating-circuit 13, including translating device 12, also through the storage battery 11, and then through main 9, conductor 7, supply-main 4, and field 22 to the negative terminal of the generator. It may be assumed when the train travels at about twenty miles per hour that the generator operates at five hundred revolutions per minute and develops a voltage which is equal to that of the batteries, which, for instance, may be sixty-four volts. When the train travels at sixty miles per hour, the generator would therefore operate at fifteen hundred revolutions per minute, and then if all other conditions remain the same the generator would develop a voltage of one hundred and ninety-two volts. The voltage cannot rise to such an extent, however, as the field strength of the generator will be decreased as the speed thereof increases. If the voltage be allowed to increase to about eighty volts at the maximum speed of the train, a sufficient increase in the voltage will be obtained to charge the batteries. It will of course be understood that the conditions which have been assumed in setting forth the operation of the system have been selected merely for the purpose of explaining the invention and that the same will vary according to the circumstances.

In the translating branch 13 of the local circuit upon each car may be arranged a resistance 27 for protecting the lamps and other translating devices from the rise in voltage which is coincident with charging the batteries. Around this resistance extends a shunt-circuit 28, which is controlled by a short-circuiting switch 29, the movable member of said short-circuiting switch preferably being attached to the plunger 17 of the automatic switch. When the automatic switch is closed, the short-circuiting switch 29 will be open, and then the resistance 27 will be in the circuit and protect the translating devices from an excessive current; but when the automatic switch is open the short-circuiting switch will be closed, and then the resistance 27 will be short-circuited, and thus removed from circuit, so that it will not decrease the voltage impressed upon the translating devices by the battery. It will of course be understood that any suitable means may be employed to protect the translating devices from an excessive voltage or to regulate the voltage impressed thereon.

It is obvious that many changes may be made in the system which has been set forth herein for the purpose of explaining the invention, which will be within the purview of the claims of this specification.

Having thus described my invention, what I claim as new, and desire to secure by Letters Patent, is—

1. In a train-lighting system, in combination, a generator driven at a variable speed, a storage battery and translating devices carried upon each of a plurality of units of the train and connected in circuit with said generator, means regulating the generator as the speed thereof varies to confine the variations in the generator output within prearranged limits, and means for preventing the aforesaid means from altering the regulation of the generator upon variations in the output of the generator resulting from changes in the number of units in the train.

2. In a train-lighting system, in combination, a generator driven at a variable speed, a storage battery and translating devices carried upon each of a plurality of units of the train and connected in circuit with said generator, means regulating said generator as the speed thereof varies to confine the variations in the generator output within prearranged limits, and means provided for each of said plurality of units of the train to prevent the aforesaid means from altering the regulation of the generator upon variations in the output of the generator resulting from changes in the number of units in the train.

3. In a train-lighting system, in combination, a generator carried upon one of the units of the train and driven at a variable speed, means regulating the generator as the speed thereof varies to confine the variations in the generator output within prearranged limits and carried upon the same unit of the train as the generator, a storage battery and translating devices carried upon each of a plurality of other units of the train and connected in circuit with said generator, and means provided for each of said plurality of units of the train to prevent the aforesaid means from altering the regulation of the generator upon variations in the generator output resulting from changes in the number of units in the train.

4. In a train-lighting system, in combination, a generator driven at a variable speed, a storage battery and translating devices carried upon each of a plurality of units of the train and connected in circuit with said generator, a dynamo-electric machine for regulating the strength of the field of the generator to confine the generator output within prearranged limits, and means for preventing said machine from altering the strength of the field of said generator upon variations in the output of the generator resulting from changes in the number of units in the train.

5. In a train-lighting system, in combination, a generator driven at a variable speed, a storage battery and translating devices carried upon each of a plurality of units of the train and connected in circuit with said generator, a dynamo-electric machine for varying the field strength of the generator inversely as the output of the generator tends to vary upon variations in the speed thereof, and means provided for each of said plurality of units of the train to prevent said machine from altering the strength of said field upon variations in the output of the generator resulting from changes in the number of units in the train.

6. In a train-lighting system, in combination, a generator driven at a variable speed, a storage battery and translating devices carried upon each of a plurality of units of the train, a supply-circuit connecting said storage battery and translating devices to said generator, an electromagnet arranged in series in said supply-circuit and controlling the output of the generator, and means provided for each of said plurality of units of the train to divert a portion of the current of the generator from said magnet.

7. In a train-lighting system, in combination, a generator driven at a variable speed, a storage battery and translating devices carried upon each of a plurality of units of the train, a supply-circuit connecting said translating devices and said storage batteries to said generator, an electromagnet arranged in series in said supply-circuit and controlling the output of said generator, and means provided for each of said plurality of units of the train to divert a portion of the current of the generator from said electromagnet, said means being connected in circuit in parallel with each other.

8. In a train-lighting system, in combination, a generator driven at a variable speed, a local circuit located upon each of a plurality of units of the train, a storage battery and translating devices connected to each of said local circuits, a supply-circuit connecting said local circuits to said generator, an electromagnet arranged in series in said supply-circuit to control the output of said generator, and a shunt-circuit extending between each local circuit and the supply-circuit and passing around said electromagnet.

9. In a train-lighting system, in combination, a generator driven at a variable speed, a local circuit arranged upon each of a plurality of units of the train, a storage battery and translating devices connected to each of said local circuits, a supply-circuit connecting said local circuits to said generator, an electromagnet arranged in series in said supply-circuit, to control the output of said generator, and a shunt-circuit extending between each local circuit and said supply-circuit and passing around said electromagnet, the several shunt-circuits being arranged in parallel with each other, and each shunt-circuit being provided with a resistance.

10. In a train-lighting system, in combination, a generator carried upon one of the units of the train and driven at a variable speed, a storage battery and translating devices carried upon another unit of the train, a local circuit located upon the latter unit of the train and having said storage battery and said translating devices connected thereto, a supply-circuit connecting said local circuit to said generator, an electromagnet arranged in series in said supply-circuit and controlling the output of said generator, and a shunt-circuit extending from said local circuit to said supply-circuit and passing around said electromagnet.

11. In a train-lighting system, in combination, a generator, a local circuit arranged upon each of a plurality of units of the train, a storage battery and translating devices connected to each of said local circuits, a supply-circuit connecting said local circuits to said generator, an electromagnet arranged in said supply-circuit in series with said translating devices and said storage batteries, to control the output of said generator, and a shunt-circuit extending from each local circuit to said supply-circuit and passing around said magnet.

12. In a train-lighting system, in combination, a generator, a local circuit arranged upon each of a plurality of units of the train, a storage battery and translating devices connected to each local circuit in parallel with each other, a supply-circuit connecting said local circuits to said generator in parallel with each other, an electromagnet arranged in said supply-circuit in series with said batteries and said translating devices, to control the output of said generator, and a shunt-circuit extending from each of said local circuits to said supply-circuit and passing around said electromagnet, said shunt-circuits being arranged in parallel with each other.

13. In a train-lighting system, in combination, a generator, a local circuit arranged upon each of a plurality of units of the train, a storage battery and translating devices connected to each local circuit, a supply-circuit connecting said local circuits to said generator, a regulator for said generator having an electromagnet controlling the operation thereof, said electromagnet being arranged in said supply-circuit in series with said storage batteries and translating devices, a shunt-circuit extending from each of said local circuits to said supply-circuit and passing around said electromagnet, said shunt-circuits being arranged in parallel with each other.

14. In a train-lighting system, in combination, a generator, a local circuit located upon each of a plurality of units of the train, a storage battery and translating devices connected to each local circuit, a supply-circuit connecting said local circuits to said generator, a dynamo-electric machine regulating said generator and having the field or controlling magnet thereof arranged in the supply-circuit in series with the storage batteries and translating devices, and a shunt-circuit extending between each local circuit and said supply-circuit and passing around said controlling-magnet.

15. In a train-lighting system, in combination, a generator driven at a variable speed, a local circuit located upon each of a plurality of units of the train, a storage battery and translating devices connected to each local circuit, a supply-circuit connecting said local circuits to said generator, a dynamo-electric machine having the armature thereof connected in the field-circuit of said generator to introduce a counter electromotive force therein, the field of said dynamo-electric machine being arranged in the supply-circuit in series with said storage batteries and translating devices, a shunt-circuit extending from each local circuit to the supply-circuit and passing around the field-magnet of said machine, said shunt-circuits being arranged in parallel with each other.

16. In a train-lighting system, in combination, a generator, a local circuit located upon each of a plurality of units of the train, a storage battery and translating devices connected to each local circuit in parallel with each other, a supply-circuit connecting said local circuits to said generator in parallel with each other, a regulator for varying the field strength of the generator inversely as the generator output tends to vary upon variation in the armature speed, said regulator being provided with an electromagnet controlling the operation thereof and arranged in the supply-circuit in series with the storage batteries and translating devices, and a shunt-circuit extending from each local circuit to the supply-circuit and passing around said controlling-magnet, said shunt-circuits being connected in parallel with each other.

17. In a train-lighting system, in combination, a generator driven at a variable speed, translating devices carried upon each of a plurality of units of the train and arranged in circuit with said generator, an electromagnetic winding controlling the output of said generator and arranged in circuit with said generator to respond to variations in current, and a shunt-circuit extending from each of said units and passing around said electromagnet, whereby the output of said generator may vary upon changes in the number of units in the train without thereby causing said winding to alter the regulation of said generator.

18. In a train-lighting system, in combination, a generator driven at a variable speed, a local circuit carried upon each of a plurality of units of the train and arranged in circuit with said generator, a storage battery and translating devices arranged in each local circuit, a regulator for regulating said generator to confine the output thereof within prearranged limits, an electromagnetic winding controlling the operation of said regulator and arranged in circuit with said generator to respond to vibrations in current, and a shunt-circuit extending from each local circuit to said generator and passing around said winding, whereby the output of said generator may vary upon changes in the number of units in the train without thereby causing said winding to alter the regulation of said generator.

19. In a train-lighting system, in combination, a generator driven at a variable speed, a main circuit extending from said generator, a local circuit arranged upon each of a plurality of units of the train and connected to said main circuit, a storage battery and translating devices arranged in each local circuit in parallel, a regulator for regulating said generator to confine the output thereof within prearranged limits, and an electromagnetic winding arranged in said main circuit in series with said storage batteries and translating devices and controlling the operation of said regulator, and a shunt-circuit extending from each local circuit and passing around said winding.

20. In a train-lighting system, in combination, a generator driven at a variable speed and arranged upon the tender of the locomotive, means for regulating said generator to confine the output thereof within prearranged limits, an electromagnetic winding arranged in circuit with said generator to respond to variations in current and controlling the operation of said means, a local circuit arranged upon each of a plurality of cars, a storage battery and translating devices arranged in each local circuit, and a shunt-circuit extending from each local circuit to said generator and passing around said winding, whereby the output of said generator may vary upon changes in the number of cars in the train without thereby causing said winding to be materially subjected to variations in current.

21. In a train-lighting system, in combination, a generator driven at a variable speed and provided with a shunt field-winding, a regulator for regulating the strength of the current in said shunt field-winding, an electromagnet controlling the operation of said regulator and arranged in circuit with said generator to respond to variations in current, a local circuit arranged upon each of a plurality of units of the train and connected to said generator, a storage battery and translating devices arranged in each local circuit, and a shunt-circuit extending from each local circuit and passing around said magnet.

22. In a train-lighting system, in combination, a generator driven at a variable speed and provided with a shunt field-winding, a dynamo-electric machine for introducing a counter electromotive force into the circuit of said winding to regulate the strength of the current therein and thereby confine the output of the generator within prearranged limits, an electromagnet controlling the operation of said dynamo-electric machine and arranged in circuit with said generator to respond to variations in current, a local circuit carried upon each of a plurality of units of the train and connected to said generator, a storage battery and translating devices arranged in each local circuit, and a shunt-circuit extending from each local circuit and passing around said electromagnet.

23. In a train-lighting system, in combination, a generator driven at a variable speed and provided with a shunt field-winding, a dynamo-electric machine for introducing a counter electromotive force into the circuit of said field-winding to regulate the strength of the current therein and thereby confine the output of said generator within prearranged limits, a main circuit extending from said generator, a local circuit arranged upon each of a plurality of units of the train and connected to said main circuit, a storage battery and translating devices arranged in each local circuit to control the operation of said dynamo-electric machine, said winding being arranged in series with said storage batteries and said translating devices, and a shunt-circuit extending from each local circuit to said generator and passing around said controlling electromagnetic winding.

24. In a train-lighting system, in combination, a generator driven at a variable speed, a main circuit extending from said generator and passing through a plurality of units of the train, a local circuit arranged upon each of said units and connected to said main circuit, a storage battery and translating devices arranged in each local circuit, a regulator for regulating said generator to confine the output thereof within prearranged limits, an electromagnetic winding for controlling the operation of said generator, said winding being arranged in said main circuit in series, and a shunt-circuit extending from each local circuit to said generator and passing around said electromagnetic winding.

25. In a train-lighting system, in combination, a generator driven at a variable speed, a main circuit extending therefrom and passing through a plurality of units of the train, a local circuit arranged upon each of a plurality of units of the train and connected to said main circuit, each local circuit being arranged in parallel with the other local circuits, a storage battery and translating devices arranged in each local circuit, a regulator for regulating said generator to confine the output thereof within prearranged limits, an electromagnetic winding for controlling the operation of said regulator, said magnet being arranged in said main circuit in series with said storage batteries and translating devices, and a shunt-circuit extending from each local circuit to said generator and passing around said winding, each shunt-circuit being provided with a resistance and arranged in circuit in parallel with the other shunt-circuits.

26. In a train-lighting system, in combination, a generator driven at a variable speed, a storage battery and translating devices carried upon each of a plurality of units of the train and arranged in circuit with said generator, a dynamo-electric machine operatively arranged in circuit with said generator to introduce a counter electromotive force into the field-circuit of said generator, said dynamo-electric machine being controlled in operation by an electromagnetic winding arranged in circuit with said generator to respond to variations in current, and means for preventing said machine from altering the regulation of said generator upon variations in the output of said generator resulting from changes in the number of units in the train.

27. In a train-lighting system, in combination, a generator driven at a variable speed and provided with a shunt field-winding, a dynamo-electric machine for introducing a counter electromotive force into the circuit of said field-winding to regulate the strength of the current therein and thereby confine the output thereof within prearranged limits, a main circuit extending from said generator and passing through a plurality of units of the train, an electromagnet arranged in said main circuit to respond to variations in current and controlling the operation of said dynamo-electric machine, a local circuit arranged upon each of said units and connected to said main circuit, a storage battery and translating devices arranged in each local circuit, and a shunt-circuit extending from each local circuit to said generator and passing around said electromagnet.

28. In a train-lighting system, in combination, a generator driven at a variable speed and provided with a shunt field-winding, a main circuit extending from said generator and passing through a plurality of units of the train, a local circuit arranged upon each of said units and connected to said main circuit, a storage battery and translating devices arranged in each local circuit, a dynamo-electric machine having an armature connected to said field-winding to introduce a counter electromotive force into the circuit thereof, a motor driving said dynamo-electric machine and taking the power to operate the same from said generator, an electromagnet controlling the operation of said dynamo-electric machine, said magnet being arranged in said main circuit in series with said storage batteries and translating devices, and a shunt-circuit extending from each local circuit to said generator and passing around said controlling electromagnet to said main circuit, each shunt-circuit being provided with a resistance and arranged in parallel with the other shunt-circuits.

29. In a train-lighting system, in combination, a generator driven at a variable speed, a local circuit arranged upon each of a plurality of units of the train and connected to said generator, an automatic switch for controlling the connection of each local circuit to said generator, a storage battery and translating devices arranged in each local circuit, means for regulating said generator to confine the output thereof within prearranged limits and provided with an electromagnetic winding for controlling the action thereof, said winding being arranged in circuit to respond to variations in current and thereby cause the regulation of the generator to be effected, and a shunt-circuit extending from each local circuit to said generator and passing around said winding, whereby the output of said generator may vary upon changes in the number of units in the train without thereby causing said winding to alter the regulation of said generator.

30. In a train-lighting system, in combination, a generator driven at a variable speed, a local circuit arranged upon each of a plurality of units of the train and connected to said generator, an automatic switch for controlling the connection of each local circuit to said generator, a storage battery and translating devices arranged in each local circuit, a dynamo-electric machine operatively arranged in circuit with said generator to confine the output thereof within prearranged limits and provided with an electromagnetic winding for controlling the operation thereof, said winding being arranged in circuit to respond to variations in current and thereby cause the regulation of said generator to be effected, and a shunt-circuit extending from each local circuit to said generator and passing around said winding, whereby the output of said generator may vary upon changes in the number of units in the train without thereby causing said machine to alter the regulation of said generator.

31. In a train-lighting system, in combination, a generator driven at a variable speed, and provided with a shunt field-winding, a train-line or main circuit extending from said generator and passing through a plurality of units of the train, a local circuit arranged upon each of said units and connected across said train-line, an automatic switch for controlling the continuity of each local circuit, a storage battery and translating devices connected to each local circuit, an automatic regulator for regulating the strength of said field-winding to confine the output of the generator within prearranged limits, an electromagnet for controlling the operation of said regulator, said magnet being arranged in said main circuit in series with the load, and a shunt-circuit extending from each local circuit to said generator and passing around said magnet, said shunt-circuits being arranged in parallel, and a resistance arranged in each shunt-circuit.

In witness whereof I have hereunto subscribed my name in the presence of two witnesses.

WILLIAM L. BLISS.

Witnesses:
   J. N. ROBERTSON,
   C. B. C. FOWLER